Sept. 6, 1932.   A. A. KRAMER   1,876,304
EXPANSION DOME FOR VEHICLE TANKS

Filed Feb. 15, 1929

INVENTOR.
ANDREW A. KRAMER.
BY Alfred R. Fuchs
ATTORNEY.

Patented Sept. 6, 1932

1,876,304

UNITED STATES PATENT OFFICE

ANDREW A. KRAMER, OF KANSAS CITY, MISSOURI

EXPANSION DOME FOR VEHICLE TANKS

Application filed February 15, 1929. Serial No. 340,109.

My invention relates to vehicle tanks and more particularly to expansion chambers for vehicle tanks.

It is a purpose of my invention to provide a vehicle tank with an expansion chamber or chambers to provide for expansion of the liquid contents of the tank after loading without loss of any of the contents thereof. Ordinarily, in a vehicle tank it is impossible to fully fill the tank without danger of the overflow of the same because of expansion of the contents thereof due to heat or other causes. Thus, the tank either has to be filled to less than the rated capacity thereof, or else the same might overflow as previously described. If the tank should overflow, or should not be filled completely in the first place, any subsequent contraction of the contents of the tank will cause the same to be only partly filled upon delivery to a customer, which is objectionable as it creates the impression that an attempt was made to give short measure. By the provision of my expansion chamber the body of the tank can be completely filled without danger of overflow, as any expansion of the contents thereof will cause the same to enter the expansion chamber.

While various forms of expansion chambers may be utilized for this purpose, I have found it desirable to make the expansion chamber of a single piece of sheet metal, and preferably said expansion chamber is provided with an inturned and downturned flange which is threaded to receive a threaded plug or closure member for closing the top of the expansion chamber. In the preferred arrangement the expansion chamber is made of such a size and shape as to also serve as a manhole dome or head. In connection with the last mentioned arrangement a cover member is provided that has both a manhole opening and a smaller opening therein for filling purposes as will be more fully described in connection with the drawing.

The downwardly extending flange portion on said expansion chamber serves both as a threaded portion for connection of the closure member therewith and as a baffle member to prevent splashing of the contents of the chamber or dome into the space within the flange receiving the downwardly extending threaded portion of the closure member. In view of the fact that the device is of relatively large diameter and is made of sheet metal, it is necessary to provide means for preventing the threaded flange portion from getting out of true circular shape so that the closure member can be threaded onto the same, and this is accomplished by providing stiffening means for said flange portion adjacent the threaded flange. The flange portion adjacent the threaded flange and extending perpendicular thereto serves as a stiffening means, and in the case where the same is inturned also serves as a clamping shoulder for clamping a gasket between the same and the closure member.

The expansion dome or chamber or fill collar is made of a heavy gauge of sheet metal and is formed by a die shaping operation into a seamless one-piece cup-like member, the lower edge of which is left unfinished in the respect that no machine work is done on the same after it leaves the press. The dome-like member thus formed is then welded into the top side of the body of a tank with the peripheral wall extending through the tank a sufficient distance so that there will be a continuous surface presented adjacent the edge of the opening of the tank for welding, any uneven portions of the bottom edge thereof, due to the drawing thereof into the cup-like shape, lying inside the body of the tank.

It may sometimes be desirable to provide openings in the depending flange portion on the dome-like member thus formed inside the tank to vent the air from the top part of the tank to permit complete filling thereof.

Other objects and advantages of the invention will appear as the description of the drawing proceeds. I desire to have it understood, however, that I do not intend to limit myself to the particular details shown or described, but that I intend to include as part of my invention all such obvious changes and modifications as would occur to a person skilled in this art and as would fall within the scope of the claims.

Figure 1:
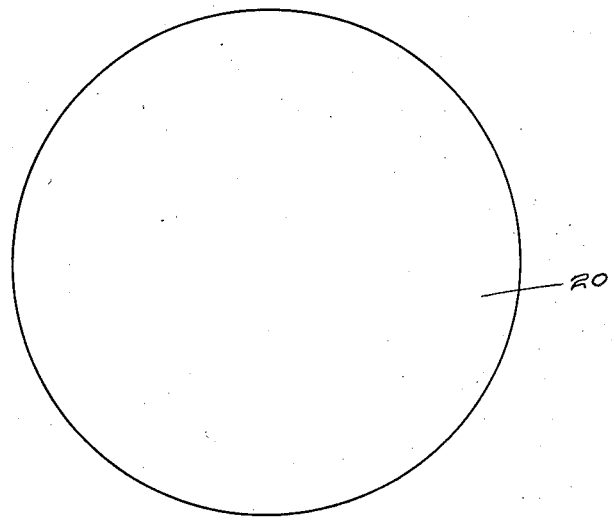
Fig. 1 is a plan view of the disk-like blank from which the expansion chamber or dome is formed.
Figure 2:
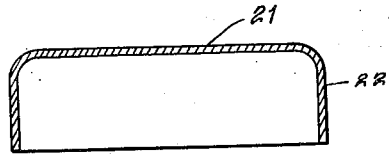
Fig. 2 is a sectional view thereof after the same has been drawn into a cup-like shape.

Referring in detail to the drawing, in Fig. 1 is shown a blank 20 from which a dome such as that forming the subject matter of my invention is made. The method described in detail is that used in making the preferred form of dome, which is a combination expansion chamber and manhead. The first step of the process is the cutting of the disk 20 from a sheet of metal, which is of a very heavy gauge. The second step of the process comprises die-shaping the disk 20 into a cup-like form such as that shown in Fig. 2, the operation being performed by means of suitably shaped male and female dies, and a hydraulic press is preferably used for carrying out the operation. The cup-like member formed comprises a closed substantially flat top or end wall portion 21 and a downturned peripheral flange 22, forming the cylindrical portion of the body of the dome.

Figure 3:
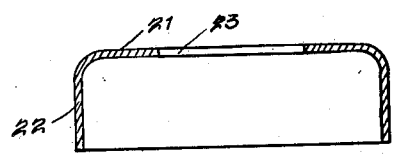
Fig. 3 is a similar view thereof after the next step in the making thereof has been performed.
Figure 4:
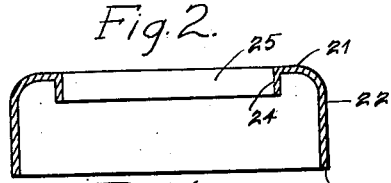
Fig. 4 is a similar view thereof after the inner flange has been formed thereon.

The third step of the method comprises cutting a circular opening 23 in the end wall 21, as shown in Fig. 3, said opening being concentric with the flange or cylindrical wall portion 22. The fourth step comprises die-shaping an inturned flange 24 on said cup-like member, by means of male and female dies, in a suitable press, said flange 24 being formed around the opening 25 in said end wall, said opening being larger than the opening 23 due to the formation of the flange 24 from the material surrounding the opening 23. The opening 25 and the flange 24 are concentrically arranged relatively to the cylindrical wall 22, and the flange 24 extends perpendicularly to the top or end wall 21, so that the flange 24 is braced thereby and stiffened so as to be held in a true circular shape.

Figure 5:
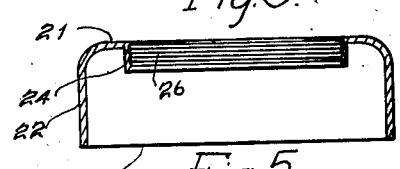
Fig. 5 is a sectional view thereof complete, but before being attached to the tank.

The fifth step of the method comprises internally threading the flange 24, as shown in Fig. 5, said threads being indicated by the numeral 26.

Figure 6:
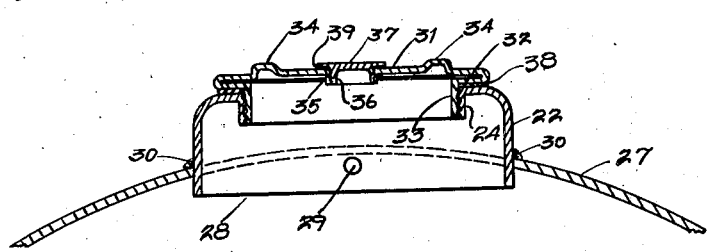
Fig. 6 is a section, partly broken away, showing the expansion dome or chamber in position on the tank with the cover thereon.

After the dome has been completed, as shown in Fig. 5, the same is secured within an opening in the top of the tank 27, the upper portion of which is shown in Fig. 6. In die-shaping the cuplike member forming the dome, the lower edge 28 thereof may have a slight unevenness, or be slightly wavy. This is not finished in any way, as it is unnecessary, but the dome is inserted in the tank a sufficient distance so that the lower end thereof having the edge 28 projects a sufficient distance into the opening in the tank 27 that a continuous welding surface lies adjacent the edge of the opening in the tank 27. It will be noted that the tank is curved along the top thereof, as is the case with vehicle tanks, and the dome is inserted a sufficient distance into the tank to allow for this curvature. In order to avoid any entrapment of air or creation of a vacuum in the top of the tank, openings such as the opening 29 may be provided in the portion of the cylindrical wall 22 extending within the tank 27. The dome is welded to the shell of the tank 27 at 30.

The form of dome shown in Figs. 5 and 6 is preferably provided with a cover member 31 that has the doubled back portion 32 thereon and the downturned externally threaded flange 33 extending from the doubled back portion 32 and engaging with the internal threads on the flange 24. This cover member is also made out of sheet metal by a die-shaping process and has the projections 34 struck out of the same for engagement by a bar for turning the cover member to tighten or to unscrew the same. Said cover member 31 is further provided with a downturned inwardly extending internally threaded flange 35 surrounding a central opening therein with which the externally threaded flange 36 on the filler plug or closure member 37, engages. The dome thus serves as a manhead, the cover member 31 serving as a manhole cover and the closure member 37 serving as a filler plug, either or both being removable, as desired. A gasket 38 is clamped between the doubled portion 32 of the cover and the dome, and a gasket 39 between the cover 31 and the plug 37.

The flange 24 serves not only as an internally threaded collar for attachment of the cover thereto, but also serves as a baffle to prevent splashing of the liquid within the tank into the interior of said collar and into the cover, thus preventing any possibility of leakage of said liquid between the dome and cover therefor. The flange 24 further provides an air chamber in the top of the dome between the flange 24 and the side wall 22.

Having thus described my invention, what I desire to claim and secure by United States Letters Patent is:

1. The combination with a tank having a shell portion having an opening therein, of a one-piece sheet metal dome thereon, said dome comprising a body portion having a top wall provided with an opening therein and an integral depending substantially cylindrical internally threaded flange portion adjacent said opening, said top wall adjacent said flange extending substantially perpendicular thereto for stiffening the same to hold said flange in a true circular form, and said body portion having an annular end portion projecting into the opening in said shell and being of substantially uniform external diameter from said inner end to a point spaced a substantial distance above said shell, said dome being secured to said shell at a point spaced from the inner end thereof so that a continuous welding surface on said dome will lie adjacent said shell, regardless of any unevenness in said inner end due to the shaping of said dome from a sheet.

2. The combination with a tank having a curved shell portion, of a one-piece sheet metal dome welded in an opening in said shell portion, said dome comprising a body portion having a cylindrical portion of substantially uniform external diameter extending from the lower edge of said dome to a point located a substantial distance above said shell portion to provide a welding surface, said dome having an integral depending substantially cylindrical internally threaded flange portion at its outer end surrounding an opening in said dome, and said dome having a stiffening portion adjacent said flange connecting said flange portion and said body portion and extending substantially perpendicular thereto for stiffening the said flange to hold the same in a true circular form.

3. The combination with a tank having a transversely curved shell portion, of a one-piece seamless cup-like sheet metal dome thereon, said dome comprising a body portion having a top wall provided with an opening therein, the body portion of said dome having the inner end portion thereof extending within said shell, said inner end portion being of substantially uniform external diameter from the inner end thereof to a point spaced a substantial distance above said shell and welded thereto at a point spaced from the inner end thereof, so that a continuous welding surface on said dome will lie adjacent said shell regardless of any unevenness of the inner edge of said dome due to the shaping of said dome from a sheet or any variation in the curvature of said shell, said dome having an integral flange portion adjacent the opening in the top wall thereof.

4. The combination with a tank having a shell portion, of a one-piece sheet metal cup-like dome thereon comprising a body portion with an external surface free from lateral projections, said body portion being welded in an opening in said shell and extending through said opening a distance such that a continuous welding surface is presented adjacent said shell regardless of any irregularity in the inner end of said body portion due to the shaping thereof out of a sheet of metal or of the shape of said shell portion.

5. The combination with a tank having a shell portion, of a one-piece sheet metal cup-like dome thereon comprising a body portion with an external surface free from lateral projections, said body portion being welded in an opening in said shell and extending through said opening a distance such that a continuous welding surface is presented adjacent said shell regardless of any irregularity in the inner end of said body portion due to the shaping thereof out of a sheet of metal or of the shape of said shell portion, the portion of said dome within said shell being perforated to avoid entrapment of air in the top of said shell.

6. As an article of manufacture, a one-piece seamless sheet metal tank dome adapted to be welded in an opening in a curved tank shell, said dome having a seamless cup-like body portion having a free lower edge, said body portion comprising a side wall portion of substantially uniform height and substantially uniform external diameter extending from said lower free edge upwardly a substantial distance to provide a welding surface said body portion having a top wall portion, said top wall portion having an opening therein and a curved wall portion integrally connecting said side wall and top wall portions and an integral seamless internally threaded flange depending substantially perpendicularly from said top wall and surrounding said opening.

7. As an article of manufacture, a one-piece seamless sheet metal tank dome having a seamless cup-like body portion having a free lower edge, said body portion comprising a side wall portion of substantially uniform height and substantially uniform external diameter extending from said lower free edge upwardly a substantial distance, said body portion having a top wall portion, said top wall portion having an opening therein and a curved wall portion integrally connecting said side wall and top wall portions and an integral seamless internally threaded flange depending substantially perpendicularly from said top wall and surrounding said opening, said side wall portion having an opening therein spaced from the free lower edge thereof.

In testimony whereof, I hereunto subscribe my name this 1st day of February, 1929.

ANDREW A. KRAMER.